Patented Sept. 20, 1938

2,130,358

UNITED STATES PATENT OFFICE 2,130,358

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application April 7, 1937, Serial No. 135,556

14 Claims. (Cl. 8—5)

This invention relates to aryl azo compounds. More particularly it relates to nuclear non-sulfonated aryl azo compounds suitable for the coloration of organic derivatives of cellulose. The invention includes the azo compounds, the process for their preparation, the process of coloring with them and materials colored with the azo compounds of the invention.

Organic derivatives of cellulose are characterized by an indifferent affinity for the usual cotton or wool dyes, especially the ordinary water soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

We have discovered that the aryl azo derivatives of compounds having the general formula:

Formula I
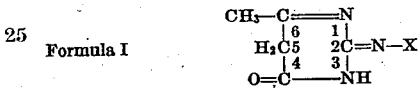

wherein X represents hydrogen, an alkyl group, an aryl group or an alkaryl group, constitute a valuable class of compounds. These compounds, which make up the compounds of our invention, have the following general formula:

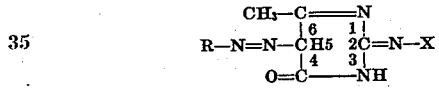

wherein X has the meaning previously assigned to it and R is an aryl nucleus. Advantageously R is an aryl nucleus of the benzene series.

The term "alkyl group" as used above is intended to include non-substituted alkyl groups, such as a methyl group, an ethyl group or a propyl group, as well as substituted alkyl groups, except as otherwise indicated, such as —CH$_2$CH$_2$OH, —CH$_2$CH$_2$CH$_2$OH
and —CH$_2$CH$_2$Cl, for example.

The nuclear non-sulfonated aryl azo compounds of our invention may be employed for the dyeing or coloring of organic derivatives of cellulose. By the employment of these nuclear non-sulfonated aryl azo compounds dyeings of good fastness to light and washing ranging in shade from yellow to red can be produced on organic derivatives of cellulose. The nuclear sulfonated aryl azo compounds (that is, compounds in which the aryl portion of the azo compound contains a nuclear sulfonic acid group) have little or no applicability for the coloration of organic derivatives of cellulose but may be employed for the coloration of other textile materials, such as wool and cotton, by customary methods of application.

The aryl azo compounds of our invention can be prepared by diazotizing an arylamine and coupling the diazonium salt formed with a compound designated by the general Formula I.

The following examples illustrate the method of preparation of the azo compounds of our invention:

Example 1

13.7 grams of o-phenetidine are dissolved in 200 cc. of water containing 30 cc. of 36% hydrochloric acid. The resulting solution is cooled to a temperature approximating 0–5° C. by the addition of ice, for example, and diazotized by adding with stirring 6.9 grams of sodium nitrite dissolved in water. In accordance with customary procedure the diazotization reaction is carried out while maintaining a temperature approximating 0–10° C.

11 grams of 2-imino-6-methyl uracil are dissolved in 200 cc. of water containing 30 grams of sodium carbonate. The resulting solution is cooled and the diazo solution prepared as described above is gradually added with stirring. Upon completion of the coupling reaction which takes place, the mixture is made acid to litmus with acetic acid. The dye compound formed is recovered by filtration, washed with water and dried.

Example 2

13.5 grams of p-aminoacetophenone are dissolved in 200 cc. of water containing 25 cc. of 36% hydrochloric acid. The resulting solution is cooled to a temperature approximating 0–5° C.

and diazotized in the usual manner by the addition of an aqueous solution of 6.9 grams of sodium nitrite.

11 grams of 2-imino-6-methyl uracil are dissolved in 200 grams of water and ice containing 10 grams of sodium hydroxide and the diazo solution prepared above is added with stirring. Upon completion of the coupling reaction, the mixture is made acid to Congo red paper by the addition of a mineral acid such as hydrochloric acid. The dye compound formed is recovered by filtration, washed with water and dried.

*Example 3*

16.8 grams of 1-amino-2-methoxy-4-nitrobenzene are added to 200 cc. of water containing 30 cc. of 36% hydrochloric acid and diazotized in the usual manner by the addition of 6.9 grams of sodium nitrite dissolved in water.

11 grams of 2-imino-6-methyl uracil are dissolved in 200 grams of water and ice containing 10 grams of sodium hydroxide and the diazo solution prepared above is added with stirring. When the coupling reaction which takes place is complete, the mixture is made acid to Congo red paper with a mineral acid, hydrochloric acid for example, and the dye compound formed is recovered by filtration, washed with water and dried.

*Example 4*

A. 7.6 grams of powdered sodium nitrite are dissolved in 53 cc. of cold sulfuric acid (specific gravity 1.84) and after the addition the solution is warmed to not over 70° C. following which it is cooled to 10–15° C.

B. 18.3 grams of 1-amino-2,4-dinitrobenzene are dissolved in 231 grams of hot glacial acetic acid and the resulting solution is rapidly cooled to room temperature.

The mixture prepared in B is added to the solution prepared in A over a period of 30–45 minutes. This addition is effected with stirring and while maintaining a temperature of 10–15° C. The solution resulting is stirred for an additional 30 minutes and one gram of urea is added to remove excess nitrous acid.

11 grams of 2-imino-6-methyl uracil are dissolved in 400 cc. of water containing sufficient sodium hydroxide to neutralize the acids present in the diazo solution prepared as described above. This diazo solution is slowly added with stirring. Upon completion of the coupling reaction, which takes place, the mixture is made acid to Congo red paper with hydrochloric acid and the dye compound formed is recovered by filtration, washed with water and dried.

*Example 5*

13.7 grams of o-phenetidine are diazotized as described in Example 1 and coupled with 15 grams of 2-ethylimino-6-methyl uracil dissolved in 200 cc. of water containing 30 grams of sodium carbonate. When coupling is complete, the mixture is made acid to litmus with acetic acid and the dye compound formed is recovered by filtration, washed with water and dried.

Equivalent molecular weights of 2-β-hydroxyethylimino-6-methyl uracil, 2-benzylimino-6-methyl uracil and 2-phenylimino-6-methyl uracil, for example, may be substituted for the 2-ethylimino-6-methyl uracil employed above.

*Example 6*

17.3 grams of 1-amino-2-nitro-4-chlorobenzene are added to 200 cc. of water containing 40 cc. of 36% hydrochloric acid and diazotized while maintaining a temperature of 10–15° C. by the addition of 6.9 grams of sodium nitrite dissolved in water.

16.6 grams of 2-β-hydroxyethylimino-6-methyl uracil are dissolved in 200 cc. of water containing 30 grams of sodium carbonate. The resulting solution is cooled and the diazo solution prepared above is slowly added with stirring. Upon completion of the coupling reaction, the mixture is made acid to litmus with acetic acid and the dye compound formed is recovered by filtration, washed with water and dried.

In order that our invention may be fully understood the preparation of a number of coupling components which may be employed in the preparation of the compounds of the invention is disclosed hereinafter.

*Preparation of 2-imino-6-methyl uracil*

2-imino-6-methyl uracil,

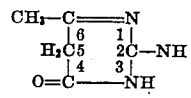

may be prepared as described in Liebig's Annalen, vol. 262, pages 365 and 366, or Berichte der Deutschen Chemischen Gesellschaft, vol. 19, pages 220 and 221.

*Preparation of 2-ethylimino-6-methyl uracil*

9.4 grams of ethyliminourea carbonate (this compound may be prepared as described in Science Papers Inst. of Chemical Research—Tokyo—16, 306–9; 24–8, 1931) are heated in 30 cc. of ethyl alcohol with 12 grams of acetoacetic ester for 4 hours. The resulting crystals of 2-ethylimino-6-methyl uracil are recovered by filtration and washed with alcohol and water. If desired, the compound may be further purified by recrystallization from hot water.

*Preparation of 2-β-hydroxyethlimino-6-methyl uracil*

12 grams of β-hydroxyethyliminourea carbonate (this compound may be prepared as described in Science Papers Inst. of Chemical Research—Tokyo—16, 306–9; 24–8, 1931) are heated in 30 cc. of ethyl alcohol with 12 grams of acetoacetic ester for 4 hours. The resulting crystals are recovered by filtration, and washed with alcohol and water. If desired, the crystals of 2-β-hydroxyethylimino-6-methyl uracil may be further purified by recrystallization from hot water.

*Preparation of 2-phenylimino-6-methyl uracil and 2-benzylimino-6-methyl uracil*

These compounds may be prepared in a similar manner as that described for 2-ethylimino-6-methyl uracil by the substitution of a corresponding equivalent molecular weight of phenyliminourea carbonate and benzyliminourea carbonate, respectively, for ethyliminourea carbonate.

The following tabulation further illustrates the compounds included within the scope of our invention together with the color they produce on cellulose acetate silk. The compounds indicated below may be prepared by diazotizing the amines listed under the heading "Amine" and coupling with the compounds specified in the column entitled "Coupling component". The diazotization and coupling reactions may, for example, be carried out in accordance with the general procedure disclosed in Examples 1 to 6 inclusive.

| Amine | Coupling component | Color on cellulose acetate silk |
|---|---|---|
| 1-amino-2-fluorobenzene | 2-imino-6-methyl uracil | Yellow. |
| 1-amino-3-fluorobenzene | do | Do. |
| 1-amino-4-fluorobenzene | do | Do. |
| 1-amino-2-chlorobenzene | do | Do. |
| 1-amino-3-chlorobenzene | do | Do. |
| 1-amino-4-chlorobenzene | do | Do. |
| 1-amino-2-bromobenzene | do | Do. |
| 1-amino-3-bromobenzene | do | Do. |
| 1-amino-4-bromobenzene | do | Do. |
| 1-amino-2-iodobenzene | do | Do. |
| 1-amino-3-iodobenzene | do | Do. |
| 1-amino-4-iodobenzene | do | Do. |
| o-Toluidine | do | Do. |
| m-Toluidine | do | Do. |
| p-Toluidine | do | Do. |
| 1-amino-2-methoxybenzene | do | Do. |
| 1-amino-3-methoxybenzene | do | Do. |
| 1-amino-4-methoxybenzene | do | Do. |
| 1-amino-2-nitrobenzene | do | Orange yellow. |
| 1-amino-3-nitrobenzene | do | Do. |
| 1-amino-4-nitrobenzene | do | Do. |
| 1-amino-2-methoxy-4-nitrobenzene | do | Do. |
| 1-amino-2-fluoro-4-nitrobenzene | do | Do. |
| 1-amino-2-chloro-4-nitrobenzene | do | Do. |
| 1-amino-2-bromo-4-nitrobenzene | do | Do. |
| 1-amino-2-iodo-4-nitrobenzene | do | Do. |
| 1-amino-2-nitro-4-fluorobenzene | do | Do. |
| 1-amino-2-nitro-4-chlorobenzene | do | Do. |
| 1-amino-2-nitro-4-bromobenzene | do | Do. |
| 1-amino-2-nitro-4-iodobenzene | do | Do. |
| 1-amino-4-acetobenzene | do | Yellow. |
| 1-amino-2-chloro-4-acetobenzene | do | Orange yellow. |
| 1-amino-2-bromo-4-acetobenzene | do | Do. |
| 1-amino-2-iodo-4-acetobenzene | do | Do. |
| 1-amino-2-nitro-4-acetobenzene | do | Do. |
| m-Aminoacetanilide | do | Yellow. |
| p-Aminoacetanilide | do | Do. |
| o-Aminophenol | do | Do. |
| m-Aminophenol | do | Do. |
| p-Aminophenol | do | Do. |
| 1-amino-2,4-dichlorobenzene | do | Orange yellow. |
| 1-amino-2,5-dichlorobenzene | do | Do. |
| 1-amino-2-methoxy-5-methyl-benzene | do | Yellow. |
| 1-amino-2-methoxy-5-chloro-benzene | do | Do. |
| 1-amino-2-methoxy-5-bromo-benzene | do | Do. |
| 1-amino-2,4-dinitrobenzene | do | Orange. |
| 1-amino-2,4,6-trinitro-benzene | do | Do. |
| 1-amino-2,4-dinitro-6-fluorobenzene | do | Do. |
| 1-amino-2,4-dinitro-6-chlorobenzene | do | Do. |
| 1-amino-2,4-dinitro-6-bromobenzene | do | Do. |
| p-Aminoazobenzene | do | Do. |
| p-Amino dimethyl aniline | do | Red. |
| p-Amino dimethyl aniline | 2-ethylimino-6-methyluracil | Do. |
| 1-amino-2-chloro-4-nitrobenzene | do | Orange yellow. |

In employing the aryl azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80–85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45–55° C., for example, following which the temperature of the dye bath will be raised to that selected for carrying out the dyeing operation. The temperature at which the dyeing is conducted will vary somewhat, depending, for example, on the particular material or materials undergoing coloration. Sodium chloride may be added, if desired, during the dyeing operation to promote exhaustion of the dyebath.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dye bath directly to the material to be colored, the azo compounds of our invention may be applied employing the methods applicable to the so-called ice colors. Briefly, in accordance with this method of dyeing, the amine is absorbed and diazotized on the fiber, after which the dye is formed in situ by developing with a coupling component such as 2-imino-6-methyl uracil or 2-ethylimino-6-methyl uracil, for example. Conversely the material undergoing dyeing or coloration may first be treated to absorb one of said coupling components and the dye subsequently formed in situ by coupling with an aryl diazonium salt. The following examples illustrate how dyeing may be carried out in accordance with our invention.

Example A 2.5 parts of the compound formed by coupling 2-imino-6-methyl uracil with diazotized 1-amino-2-nitro-4-chlorobenzene in an alkaline medium are finely ground with soap and dispersed in 1000 parts of water. The dispersion thus prepared is heated to a temperature approximating 45–55° C. and 100 parts of cellulose acetate silk in the form of taffeta or threads, for example, are added to the dye bath after which the temperature is gradually raised to 80–85° C. and the cellulose acetate silk worked for several hours at this latter temperature. Upon completion of the dyeing operation, the cellulose acetate silk is removed, washed with soap, rinsed and dried. The cellulose acetate silk is dyed an orange-yellow shade.

Example B 2.5 parts of the compound formed by coupling 2-imino-6-methyl uracil with diazotized 1-amino-2-methoxybenzene are finely ground with soap and dispersed in 1000 parts of water. The dispersion thus prepared is heated to a temperature approximating 45–55° C. and 100 parts of cellulose acetate silk in the form of taffeta or threads, for example, are added to the dye bath after which the temperature is gradually raised to 80–85° C. and the cellulose acetate silk worked for several hours at this latter temperature. Upon completion of the dyeing operation, the cellulose acetate silk is removed, washed with soap, rinsed and dried. The cellulose acetate silk is dyed a yellow shade.

While our invention has been illustrated in connection with the dyeing of cellulose acetate silk it will be understood that dyeing operations can be carried out in a manner similar to that described above by the substitution of another organic derivative of cellulose material for cellulose acetate silk or by employing dye compounds other than those employed in the examples, or by substitution of both the material being dyed and the dye compounds of the examples.

We claim:

1. An azo compound having the general formula:

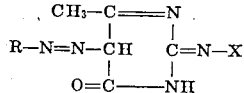

wherein X represents a member selected from the group consisting of hydrogen, a phenyl nucleus and a benzyl nucleus and R represents an aryl nucleus of the benzene series.

2. An azo compound having the general formula:

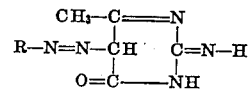

wherein R represents an aryl nucleus of the benzene series.

3. An azo compound having the general formula:

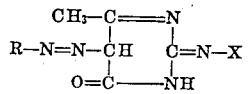

wherein X represents an alkyl group and R represents an aryl nucleus of the benzene series.

4. An azo compound having the general formula:

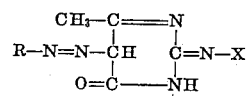

wherein X represents a hydroxyalkyl group and R represents an aryl nucleus of the benzene series.

5. An azo compund having the general formula:

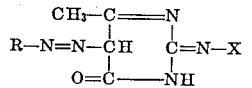

wherein X represents a phenyl nucleus and R represents an aryl nucleus of the benzene series.

6. The process of coloring an organic derivative of cellulose which comprises applying thereto a dye selected from the class of azo compounds having the general formula:

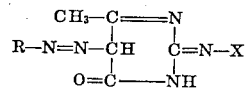

wherein X represents a member selected from the group consisting of hydrogen, an alkyl group, a phenyl nucleus and a benzyl nucleus and R represents a nuclear non-sulfonated aryl nucleus of the benzene series.

7. The process of coloring an organic acid ester of cellulose which comprises applying thereto a dye selected from the class of azo compounds having the general formula:

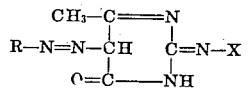

wherein X represents a member selected from the group consisting of hydrogen, an alkyl group, a phenyl nucleus and a benzyl nucleus and R represents a nuclear non-sulfonated aryl nucleus of the benzene series.

8. The process of coloring a cellulose acetate which comprises applying thereto a dye selected from the class of azo compounds having the general formula:

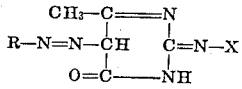

wherein X represents a member selected from the group consisting of hydrogen, an alkyl group, a phenyl nucleus and a benzyl nucleus and R represents a nuclear non-sulfonated aryl nucleus of the benzene series.

9. The process of coloring a cellulose acetate which comprises applying thereto a dye selected from the class of azo compounds having the general formula:

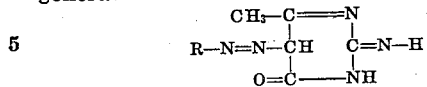

wherein R represents a nuclear non-sulfonated aryl nucleus of the benzene series.

10. Material containing an organic derivative of cellulose colored with a dye selected from the class of azo compounds having the general formula:

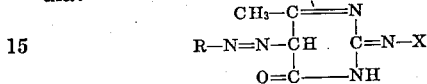

wherein X represents a member selected from the group consisting of hydrogen, an alkyl group, a phenyl nucleus and a benzyl nucleus and R represents a nuclear non-sulfonated aryl nucleus of the benzene series.

11. Material containing an organic acid ester of cellulose colored with a dye selected from the class of azo compounds having the general formula:

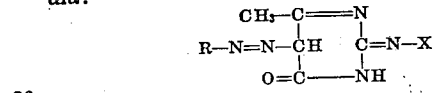

wherein X represents a member selected from the group consisting of hydrogen, an alkyl group, a phenyl nucleus and a benzyl nucleus and R represents a nuclear non-sulfonated aryl nucleus of the benzene series.

12. A cellulose acetate colored with a dye selected from the class of azo compounds having the general formula:

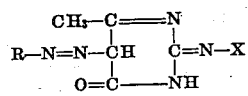

wherein X represents a member selected from the group consisting of hydrogen, an alkyl group, a phenyl nucleus and a benzyl nucleus and R represents a nuclear non-sulfonated aryl nucleus of the benzene series.

13. A cellulose acetate colored with a dye selected from the class of azo compounds having the general formula:

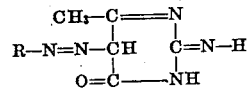

wherein R represents a nuclear non-sulfonated aryl nucleus of the benzene series.

14. A process of preparing azo compounds which comprises coupling a diazotized arylamine of the benzene series with a compound having the general formula:

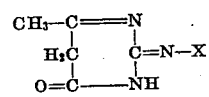

wherein X represents a member selected from the group consisting of hydrogen, an alkyl group, a phenyl nucleus and a benzyl nucleus.

JAMES G. McNALLY.
JOSEPH B. DICKEY.